United States Patent [19]
Dolan

[11] Patent Number: 6,017,260
[45] Date of Patent: Jan. 25, 2000

[54] SPEAKING TOY HAVING PLURAL MESSAGES AND ANIMATED CHARACTER FACE

[75] Inventor: Marisa Dolan, Torrance, Calif.

[73] Assignee: Mattel, Inc., El Segundo, Calif.

[21] Appl. No.: 09/137,461

[22] Filed: Aug. 20, 1998

[51] Int. Cl.[7] .............................. G09B 5/00; A63H 3/28; A63H 3/33; G11B 17/22
[52] U.S. Cl. ........................ 446/298; 446/246; 434/308; 369/31; 369/63
[58] Field of Search ..................................... 446/246, 265, 446/297–303, 321, 322; 434/308, 309, 319, 169; 369/31, 63

[56] References Cited

U.S. PATENT DOCUMENTS

| | | |
|---|---|---|
| D. 320,419 | 10/1991 | Wohl . |
| D. 359,521 | 6/1995 | Kino . |
| 3,383,114 | 5/1968 | Ryan . |
| 3,711,964 | 1/1973 | Folson et al. . |
| 3,774,908 | 11/1973 | Greenburg . |
| 3,871,112 | 3/1975 | Licitis . |
| 4,150,831 | 4/1979 | Watanabe . |
| 4,433,404 | 2/1984 | Watanabe . |
| 4,510,590 | 4/1985 | Girton et al. . |
| 5,054,012 | 10/1991 | Koike et al. . |
| 5,382,188 | 1/1995 | Tomellini . |

*Primary Examiner*—D. Neal Muir
*Assistant Examiner*—Laura Fossum
*Attorney, Agent, or Firm*—Roy A. Ekstrand

[57] ABSTRACT

A generally circular flat housing supports a handle, a pivotable lever, and a base portion. At the circular portion of the housing, a ring of character segments each having a visually depicted character thereon are supported. A pointer is rotatably supportable upon the housing and is movable to point to a selected one of the characters. A character image is supported on a circular plate at the center of the housing and includes apparatus for moving face components to simulate the speaking action of the image character. An electronic sound module of conventional design is supported within the interior of the housing and is provided with speech or phrase selections by a rotating multiple segment contact pad set together with a pair of contact brushes. When the pivotally mounted handle is pulled down, a gear drive mechanism is configured for operation and energy is stored in a return spring. When the handle is released, the energy within the stored spring draws the handle upwardly in a slow travel which further drives the gear mechanism for animating the character face and which triggers the production of sound from the sound module.

11 Claims, 4 Drawing Sheets

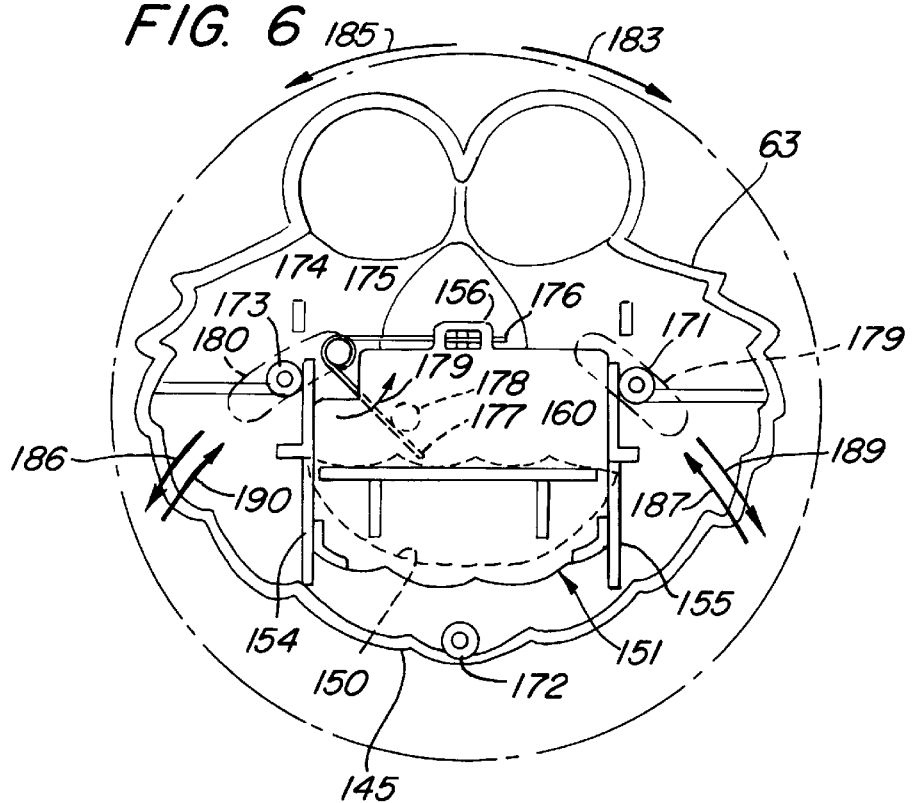
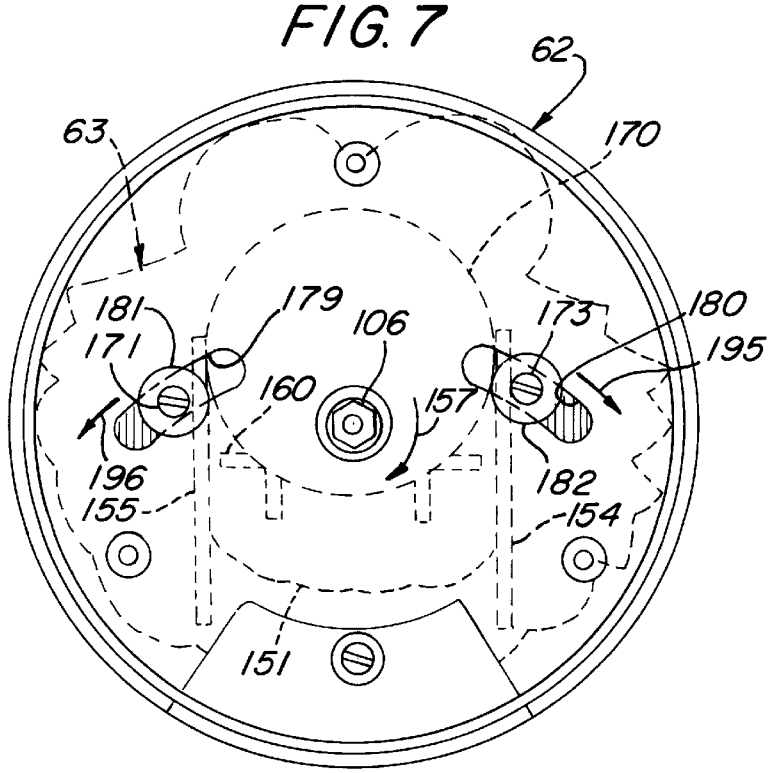

SPEAKING TOY HAVING PLURAL MESSAGES AND ANIMATED CHARACTER FACE

FIELD OF THE INVENTION

This invention relates generally to speaking toys and particularly to those having a plurality of selectable messages.

BACKGROUND OF THE INVENTION

A popular speaking toy which has enjoyed long lasting popularity is manufactured and marketed by Mattel, Inc. which is located in El Segundo, Calif. This product line under the trademark "See 'N Say" has been provided in various aesthetic themes through the years. The basic speaking toy provided utilizes a generally flat, approximately circular housing having a pivotally supported handle at the side of the housing. The housing further supports an outer ring divided into a plurality of segments, each of which bear a character or legend thereon. A multiple track phonograph record is rotatably supported within the housing and is coupled to a stylus and amplifying speaker cone for playing the selected one of the plural audio messages recorded on the record. The plurality of recorded tracks on the record are helically spiralled to permit playing of any recorded message by placement of the stylus at the starting point on the record. The housing further supports a rotatable pointer which is coupled to the stylus placement apparatus to allow the pointer position aligned with any of the character segments to select the corresponding message for play. In a later version of this product, the system is supplemented by a character face supported within the interior of the character segment ring which is mechanically coupled to the pivoting lever to cause articulation of facial elements during play.

Other similar products have been used for various speech exercise and training applications. For example, U.S. Pat. No. 3,383,114 issued to Ryan sets forth a TEACHING DEVICE having a generally circular housing supporting a rotating center pointer and an annular segmented outer ring having plural segments which each bear a letter and image associated therewith. Thus, for example, the segment labelled A has an apple image while the segment labelled B has a baseball bat and so on. A multiple track phonograph record mechanism is operated in accordance with the position of the pointer to articulate information related to the segment.

U.S. Pat. No. 3,711,964 issued to Folson et al sets forth an ASK AND ANSWER TOY having a phonograph apparatus supported within a housing together with a pointer wheel which is rotatable to point to a plurality of picture images arranged about the pointer in a generally radial arrangement. A pull string mechanism is operative together with a speed governor to store energy in the spring of the pull speed mechanism as the string is pulled and utilize the spring force to rotate the phonograph record and play a given message.

U.S. Pat. No. 5,382,188 issued to Tomellini sets forth an AUDIO PLAYBACK DEVICE formed in the configuration of a conventional telephone. The device includes an image plate having a plurality of images thereon and an integrated circuit assembly having a memory which is preprogrammed with a plurality of sound tracks corresponding to the image. The circuit assembly further includes an output unit for outputting sound tracks in a switch assembly for actuating the output. A rotatable selector controls the selection of messages by pointing to a corresponding image.

U.S. Pat. No. 3,871,112 issued to Licitis sets forth a COORDINATED VISUAL AND AUDIO REPRODUCING APPARATUS which provides a story telling toy device providing for selection of a number of recorded message segments to be played in a plurality of different combinations. Each message segment is attributable to a particular visual image in a series of visual images.

U.S. Pat. No. 4,150,831 issued to Watanabe sets forth a TOY RECORD PLAYER having a record turntable for receiving a record having a plurality of selectable tracks.

U.S. Pat. No. 4,433,404 issued to Watanabe sets forth a VARIETY PLAYING SOUND REPRODUCING DEVICE having a rotatable turntable driven by a constant torque spring and motor combination.

U.S. Pat. No. 4,510,590 issued to Girton et al sets forth a PULL STRING INERTIAL VOICE UNIT having a spring powered pull string wound source of rotational energy coupled to a record bearing turntable. A stylus is movable within the unit to facilitate tracking the recorded sound grooves in the record as the spring energy rotates the turntable.

U.S. Pat. No. 5,054,012 issued to Koike et al sets forth a SOUND REPRODUCING DEVICE FOR PLAYING A RECORD DISK HAVING A PLURALITY OF RECORDED GROOVES which utilizes a rotatable disk operative under spring power to rotate while a stylus is positioned in engagement with a multiple track record. A pointer is rotatable upon the unit and is operative to select from among the various tracks and messages by positioning the stylus over the lead in for the selected track.

U.S. Pat. No. DES. 359,521 issued to Kino and U.S. Pat. No. DES. 320,419 issued to Wohl set forth aesthetic designs for speaking type toys.

While the foregoing described prior art devices have improved the art, and in some instances enjoyed commercial success, there remains nonetheless a continuing need in the art for evermore improved, amusing, and effective speaking toys.

SUMMARY OF THE INVENTION

Accordingly, it is a general object of the present invention to provide an improved speaking toy. It is a more particular object of the present invention which provides an improved speaking toy having plural messages and an animated character associated therewith.

In accordance with the present invention, there is provided a speaking toy comprising: a housing having a generally circular face portion supporting an annular ring having a plurality of segments, each segment supporting an image, a lever slidably supported within the housing having a return spring and having an end portion extending outwardly from the housing, the end portion having a handle thereon, a character image, supported within said annular ring, having a face and movable face elements, gear drive means, coupled to the lever having a center shaft, for rotating the center shaft as the lever is moved against the return spring and released to move under the force of the return spring, a sound module having a plurality of stored speech messages, a pointer ring, rotatably supported on the housing within the annular ring, having a pointer, the pointer ring having a gear movable therewith, a message selector having a selector gear engaging the ring gear coupled to the sound module for selecting a speech message from among the plurality, face movement means, coupled to the gear drive means, for moving the movable face elements as the center shaft rotates, and switch means operated by movement of the lever causing activation of the sound module to play a message selected by the pointer and the message selector.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, and in which:

FIG. 6 sets forth a rear view of the animated face of the present invention speaking toy; and FIG. 7 sets forth a front view of the supporting plate apparatus of the present invention speaking toy which supports the animated character.

DESCRIPTION OF THE PREFERRED EMBODIMENT

Figure 1:
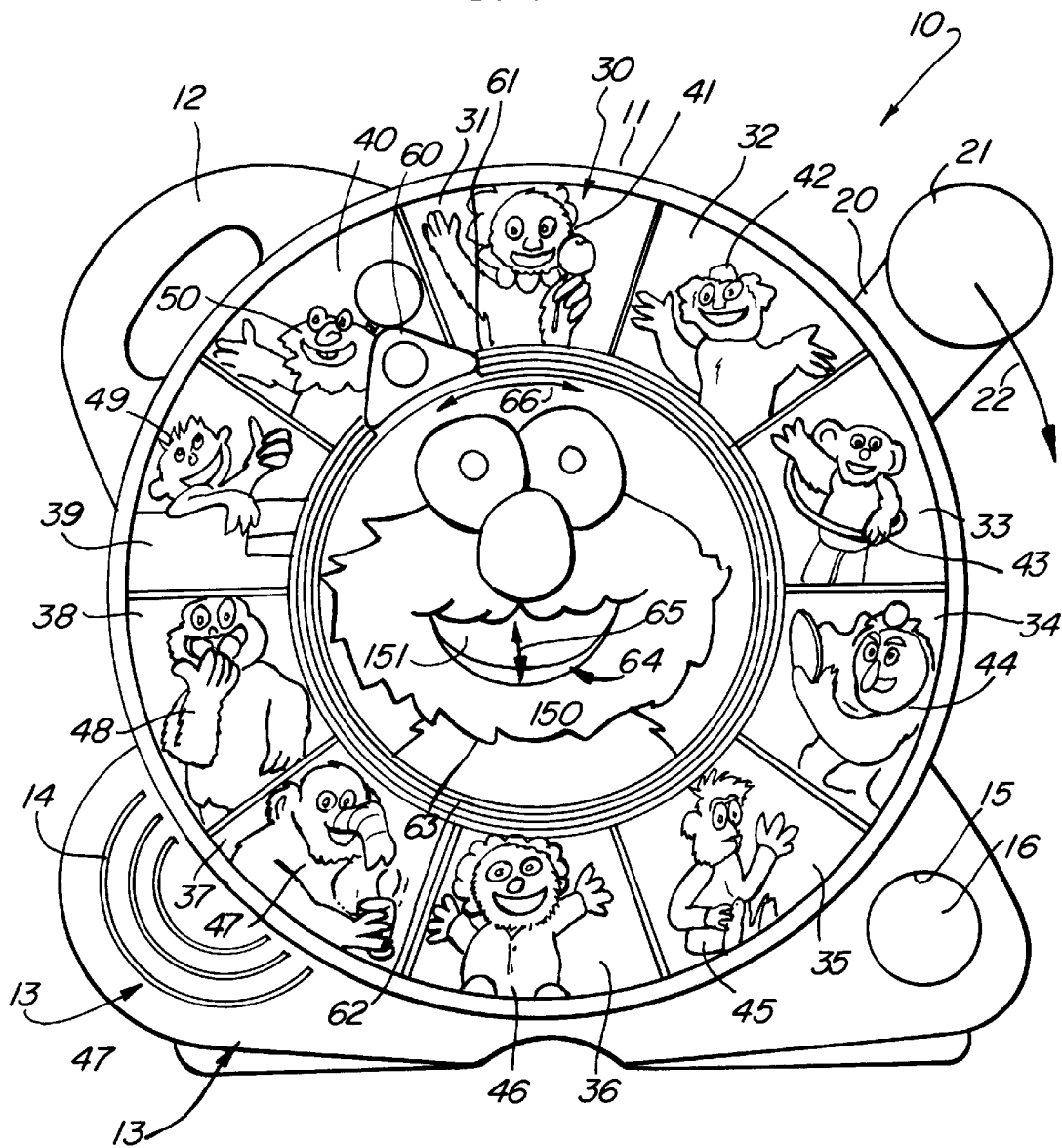
FIG. 1 sets forth a front view of a speaking toy constructed in accordance with the present invention.

FIG. 1 sets forth a front view of a speaking toy constructed in accordance with the present invention and generally referenced by numeral 10. Speaking toy 10 includes a generally circular housing 11 having a handle 12 and a base 13 formed therein. Base 13 defines an aperture 15 supporting a push button 16. Toy 10 further includes a pivotable lever 20 having a handle 21. By means set forth below in FIG. 2, lever 20 is pivotable about housing 11 in the direction indicated by arrow 22. Housing 11 further supports an annular ring 30 having a plurality of generally equal segments 31 through 40 upon which a corresponding plurality of images 41 through 50 are formed.

Toy 10 further includes a rotatable pointer 60 supported by a pointer ring 61 in the manner set forth below in FIG. 2. Suffice it to note here that pointer 60 is rotatable to positions of alignment with selected ones of images 41 through 50 supported within segments 31 through 40. Base 13 further defines a speaker grille 14 which allows sound produced by a speaker 85 (seen in FIG. 2) to permeate outwardly from the base.

Toy 10 further includes a character plate 62, the structure of which is set forth below in FIGS. 3 and 7 in greater detail. Suffice it to note here that character plate 62 is supported above and within pointer ring 61 and further supports a character image 63. In the preferred fabrication of the present invention and as is set forth below in FIG. 3 in greater detail, character image 63 is preferably formed of a relief to simulate three dimensional quality. However, a two dimensional image may be used if desired. Character image 63 includes a mouth 64 having a mouth aperture 150 through which a movable closure plate 151 is supported and moved in the directions indicated by arrows 65. In addition, by means better seen in FIGS. 3 through 7 and described below, character image 63 is caused to simultaneously provide the appearance of opening and closing mouth 64 while also wobbling back and forth in the directions indicated by arrows 66 during activation of speaking toy 10.

In operation, speaking toy 10 is prepared for an operative cycle by the user's rotation of pointer 60 to a desired segment upon annular ring 30 which in turn points to a selected image from among images 41 through 50. Once pointer 60 has been positioned, apparatus within housing 11 set forth below in FIG. 2 operates to select a corresponding message to be played through speaker 85 by a sound module 123 (seen in FIG. 2). Thereafter, the user pivots the handle 21 and lever 20 downwardly in the direction indicated by arrow 22 along the right hand side of housing 11. By means set forth below in FIG. 2, the downward pivotal movement of lever 20 and handle 21 simultaneously stores energy within a drive spring supported in housing 11 and energizes the electronic sound module. At the end of the downward stroke, handle 21 is released and lever 20 returns to the position shown in FIG. 1 in a relatively slow movement. The energy stored within the return spring causes the animation of character image 63 as mouth 64 moves in the direction indicated by arrows 65 and as the entire character image wobbles in the manner indicated by arrows 66. The sound output, having been selected by the position of pointer 60, comprises a message or other audio information which amuses, entertains, and in some instances, educates the child user.

In addition to the operation of speaking toy 10 using lever 20 and pointer 60, button 16 is supported within aperture 15 to provide a depressible button which by means set forth below in greater detail, operates to cause the internal sound module of toy 10 to produce so-called "special effect" signals. These signals are prestored within the sound module and may, for example, include horn sounds, train sounds, sounds associated with explosions, etc. As a result, the child user is able to operate speaking toy 10 in a normal fashion using handle 21 and lever 20 while punctuating the message being played with sound effects produced by pressing button 16. In its preferred form, housing 11 is fabricated of a molded plastic material suitable for low cost, high volume mass production. Similarly, character plate 62 and character 63 are also preferably formed of a standard low cost molded plastic material. As will be equally apparent in the descriptions of FIGS. 2 through 7 which follow, the remaining components used in fabricating speaking toy 10 are also suitable for fabrication of standard relatively low cost injection molded plastic materials. However, other materials may be used without departing from the spirit and scope of the present invention.

Figure 2:
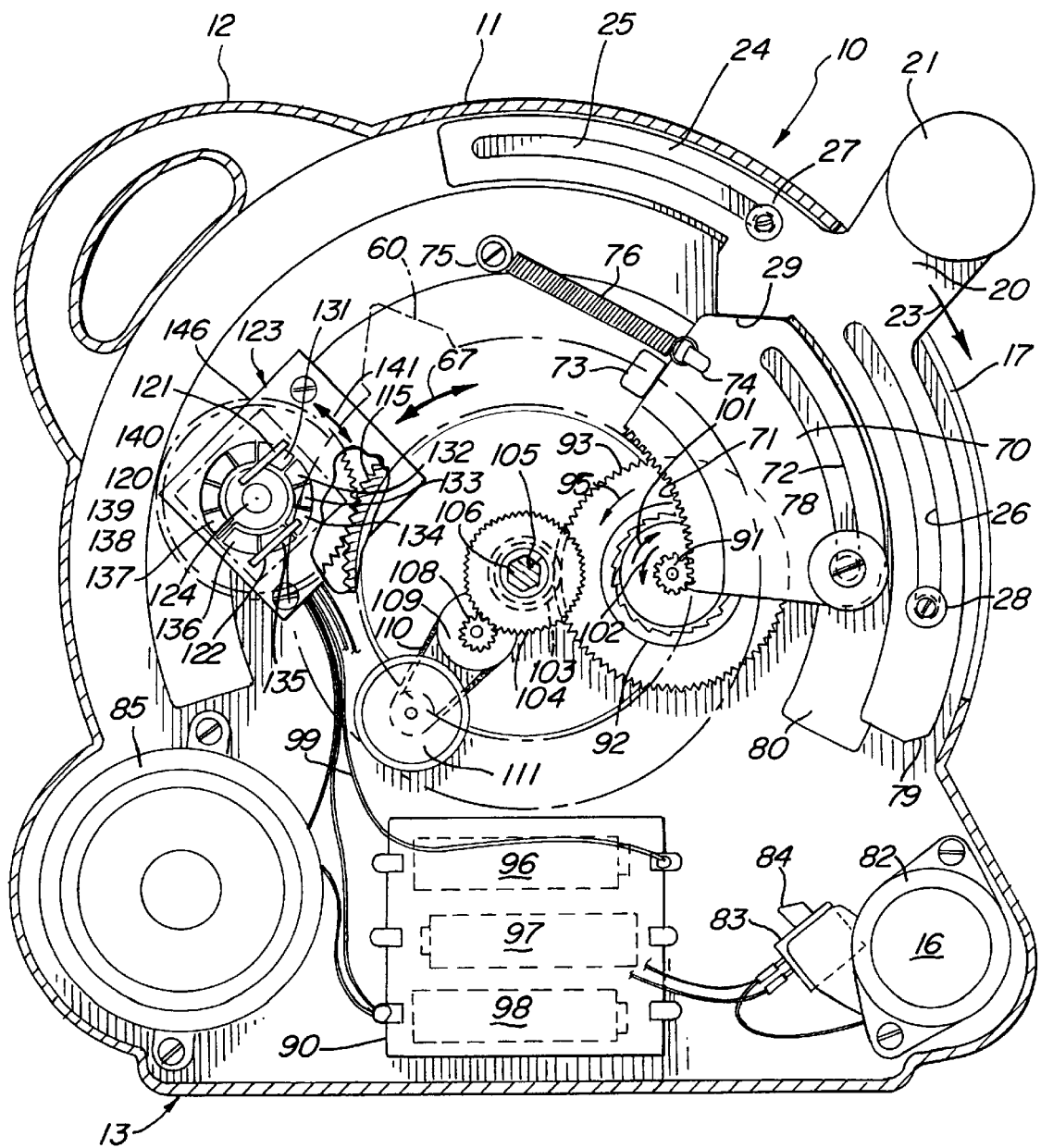
FIG. 2 sets forth a front section view of the present invention speaking toy.

FIG. 2 sets forth a section view of speaking toy 10 in which housing 11 is shown sectioned to display the apparatus relating to lever 20, speaker 85, and character image 63 (seen in FIG. 1).

More specifically, housing 11 defines a handle 12, a base 13, and an elongated curved slot 17. A lever 20 supports a handle 21 on the exterior thereof and an arcuate guide 24 having a curvature which allows arcuate guide 24 to move slidingly within the curvature of housing 11 adjacent slot 17. Arcuate guide 24 further defines a pair of curved slots 25 and 26 on each side of lever 20 within which a pair of guide posts 27 and 28 are secured. The resulting structure of posts 27 and 28 within curved slots 25 and 26 allows the combined structure of lever 20, handle 21, and arcuate guide 24 to move slidingly in an arcuate path within housing 11. The positions of posts 27 and 28 form limit stops to limit the sliding travel of arcuate guide 24 in each direction.

A lever gear 70 having a gear segment 71 on the interior edge thereof is positioned in proximity to arcuate guide 24 of lever 20. Lever gear 70 further defines a curved slot 72 within which a post 78 is formed in housing 11 which extends upwardly through and which is captivated within slot 72. Lever gear 70 further defines a spring tab 74 which receives one end of a return spring 76. The remaining end of spring 76 is secured to a post 75 formed within housing 11. Also formed within housing 11 and associated with lever gear 70 is a stop block 73 which limits the travel of lever gear 70. In addition, lever gear 70 defines an upper edge 77 which contacts a lower edge 29 of arcuate guide 20. In this fashion, movement of handle 21 and lever 20 in the direction of arrow 23 serves to carry lever gear 70 in a corresponding curved motion.

A ratchet drive coupling 92 includes a gear 91 engaging gear 71 and a gear 93. The coupling between gear 91 and gear 93 is a single direction coupling in which ratchet 92 engages in one direction (arrow 102) and disengages in the opposite direction (arrow 101). Thus unlike gear couplings in the remainder of apparatus shown in FIG. 2, ratchet 92 couples rotational power from gear 91 to gear 93 solely in response to rotation of gear 91 in the direction of arrow 102. In the opposite direction, the angular faceted teeth shown in ratchet 92 slip as gear 91 rotates. Gear 93 engages gear 103 which is joined to a larger diameter gear 104. Gear 104 engages a gear 108 which is integrally formed with a pulley 109. Pulley 109 supports one end of a belt 110 which in turn is received upon a pulley 111. An aperture 105 formed in gear 104 allows a hexagonal shaft 106 coupled to gear 103 to extend upwardly past gear 104 and ultimately to drive eccentric plate 170 and cam 162 (seen in FIG. 4).

As mentioned above, a pointer 60 is rotatably supported within housing 11 by a pointer ring 61. Pointer ring 61 is supported by conventional means (not shown) which center the rotation of pointer ring 61 at the center of shaft 106. Pointer ring 61 includes an external ring gear 115 which rotates in direct correspondence to the rotating motion of pointer ring 61.

A sound module 123 which may be fabricated entirely in accordance with conventional fabrication techniques, is supported upon a printed circuit board 146 and is secured within housing 11 by a pair of conventional fasteners. The sound producing circuit used in sound module 123 is entirely conventional in fabrication and provides a sound producing circuit which includes a conventional memory and sound signal apparatus responsive to input signals to select among a plurality of stored messages for audibilizing or playing through speaker 85. Of importance with respect to the present invention is the further provision upon sound module 123 of a pair of electrical contact brushes 121 and 122 together with a plurality of radially positioned contact pads 131 through 140 encircling a center common connector 130. The combined structures of contact brushes 121 and 122 are rotatably supported by a shaft 124 extending through the center of the array of contact pads 131 through 140. Beneath printed circuit board 146 the remaining end of shaft 124 is coupled to a gear 120 which engages ring gear 115 of pointer ring 61. Thus as pointer ring 61 rotates in either direction, gear 120 is correspondingly rotated thereby moving the positions of contact brushes 121 and 122 with respect to pads 131 through 140. In the position shown in FIG. 2, contact brush 121 maintains its electrical connection to common connector pad 130 while contact brush 122 is shown contacting pad 134. The connection from contact brushes 121 and 122 is not shown in FIG. 2, but in accordance with conventional fabrication techniques, the contact brushes are connected by wires and printed circuit board pads to supply a signal input to sound module 123.

Housing 11 further supports a battery chamber 90 having a plurality of batteries stored therein including batteries 96, 97, and 98. For purposes of avoiding undue cluttering of the drawing, the entire wiring system of toy 10 is not shown in detail. It will be apparent to those skilled in the art that the electrical elements of the system of toy 10 are operatively coupled in accordance with conventional fabrication techniques.

As a result, speaker 85 is operatively coupled to sound module 23 and to the batteries within battery chamber 90. In addition, a bracket 81 positioned within housing 11 supports a switch 83 having an angularly faceted push button 84 together with a switch 82. Switch 82 supports button 16 which, as is seen in FIG. 1 forms the special effects button for toy 10. Suffice it to note here that button 16 provides actuation of switch 82 while button 84 when depressed actuates switch 83. By means not shown, but in accordance with conventional fabrication techniques, switch 83 is coupled to sound module 123 to activate the sound module.

In operation, and assuming initially that lever 20 and handle 21 have relaxed to their rest position in shown in FIG. 2, the operative cycle of toy 10 is initiated by the user in moving pointer 60 to align the pointer with a selected image in the manner shown in FIG. 1. As pointer 60 is rotated in either direction as indicated by arrows 67, the engagement of ring gear 115 and gear 120 produce the above-described rotation of gear 120 and the assembly of contact brushes 121 and 122 in corresponding directions as indicated by arrows 141. As pointer 60 moves between two positions or segments of images, gear 115 and gear 120 cooperate to correspondingly move the positions of contact brushes 121 and 122 to provide electrical connection to the contact pad set which corresponds to that selected image.

Once the desired position of pointer 60 has been set, the user then pulls handle 21 and lever 20 in a downwardly curved path in the direction indicated by arrow 23 bringing lever 20 into contact with the end of slot 17. The downward movement of handle 21 and lever 20 produces a corresponding downwardly curved movement of arcuate guide 24. The engagement of edge 29 of guide 24 with edge 77 of lever gear 70 carries lever gear 70 in a correspondingly downwardly movement overcoming the force of spring 76 and storing energy within the spring. As lever gear 70 moves downwardly, gear segment 71 thereof which engages gear 91 rotates gear 91 in the direction indicated by arrow 101. As mentioned above, the rotation of gear 91 in the direction of arrow 101 is in the "slip" direction for ratchet 92. Accordingly, while gear 91 rotates as gear 71 moves in an arcuate path, no rotation is imparted to gear 93 and the remaining gear drive components remain generally unmoved. As lever 20 approaches the bottom end of slot 17, an angled facet end portion 79 of arcuate guide 24 is brought against the angled facet of button 84. The position of button 84 maintained by bracket 81 is selected to allow the contact of angled facet 79 to depress button 84 and actuate switch 83. As a result, switch 83 is closed and sound module 123 begins operation. In addition, switch 82 is wired by conventional fabrication means to sound module 123 to trigger a sound effects input condition causing sound module 123 to produce sound effects such as those described above each time button 16 is depressed.

Once lever 20 and handle 21 have been pulled downwardly to their maximum position, spring 76 has been stretched to store a substantial spring force. Thus in the fully downward position, spring 76 is fully stretched and switch 83 is actuated. Thereafter, the user simply releases handle 21 allowing the return force of spring 76 to draw lever gear 70 and arcuate guide 24 upwardly to return to the position shown in FIG. 2. As lever gear 70 is drawn upwardly, gear 91 is rotated in the direction indicated by arrow 102 which is the engagement coupling direction of ratchet 92. As a result, rotation of gear 91 in the direction of arrow 102 produces a corresponding rotation of gear 93 in the direction indicated by arrow 95. As mentioned above, gear 93 engages gear 101 which is joined to gear 104. Thus as gear 93 rotates, gear 103 rotates which in turn rotates shaft 106. The rotation of shaft 106 operates the mouth moving mechanism of the present invention shown in FIGS. 3 through 7 and described below. Simultaneously, with the upward travel of arcuate guide 24 releasing button 84, speech module 123 initiates an audible message corresponding to selector pad 134 which is played through speaker 85. Because of the substantial gear mechanism coupled to lever gear 70, the upward travel of lever gear 70 and lever 20 is slowed substantially prolonging the operative stroke during which sound module 123 is operative together with the moving of image 63 (seen in FIG. 3). As a result, handle 21 and lever 20 may be moved downwardly in a relatively short stroke and when released, return upwardly in a longer duration slower stroke which prolongs the operative period of the toy.

Each cycle of toy 10 is carried forward in the same manner as the child user repeatedly moves pointer 60 to the desired character from among character images 41 through 50 (seen in FIG. 1) and thereafter draws lever 20 and handle 21 downwardly and then releases the lever. In addition to the selection of previously stored messages accomplished by contact brushes 121 and 122, the pressing of button 16 at any time will actuate switch 82 injecting a previously stored sound effect which is processed by sound module 123 to drive speaker 85.

Figure 3:
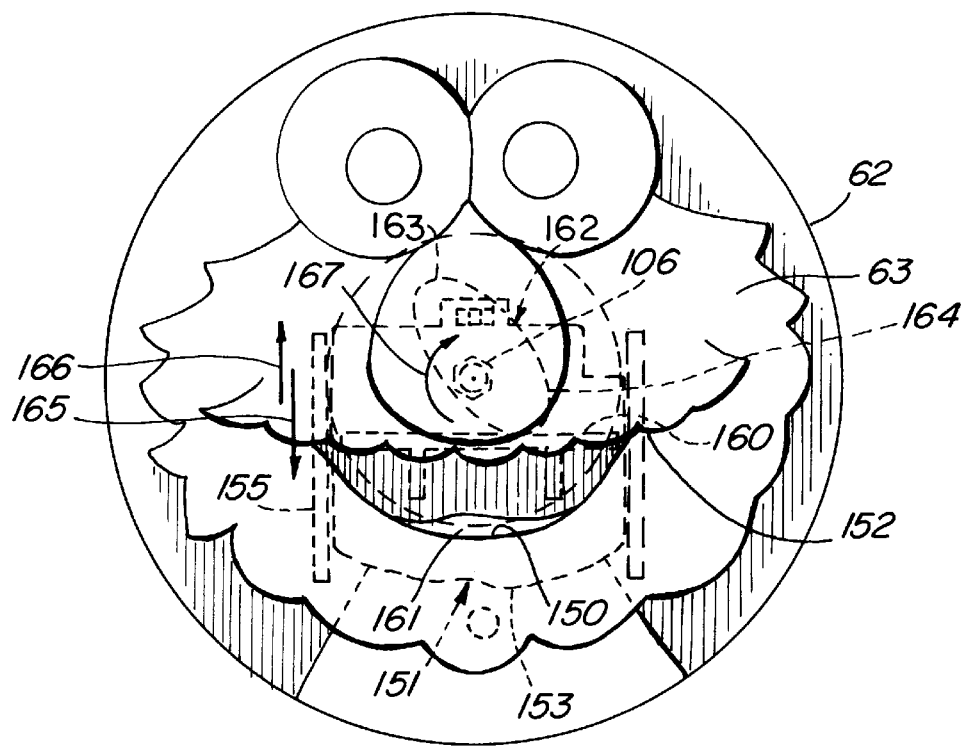
FIG. 3 sets forth a partial front view of the animated character in the present invention showing underlying apparatus for animating the character face.

FIG. 3 sets forth a front view of character plate 62. Character plate 62 supports an image 63 which, as mentioned above, is preferably fabricated as a relief to provide a three dimensional quality to the image. Image 63 defines a mouth aperture 150 together with a generally planar closure plate 151 (better seen in FIG. 5). Closure plate 151 is slidably movable behind mouth aperture 150 and supports selected visual images such as lip image 161 whereby vertical movement of closure plate 151 provides a visual effect of mouth opening and closing for image 63.

As is also seen in FIG. 6, a rear surface of character plate 62 includes a pair of generally parallel guide ribs 154 and 155. Closure plate 151 is slidably supported between guides 154 and 155 and is movable in the directions indicated by arrows 165 and 166. As is better seen in FIG. 5, closure plate 151 further includes a horizontally extending cam follower rib 160 which extends substantially the width of closure plate 151.

Also shown in FIG. 3 is the position of shaft 106 which engages a cam 162 (seen in FIG. 4) which defines cam lobes 163 and 164. Cam 162 is shown generally elliptical. However, it will be apparent to those skilled in the art that a variety of cam shapes can be used to impart a corresponding variety of mouth motion profiles without departing from the spirit and scope of the present invention.

In operation, as shaft 106 is rotated in the direction indicated by arrow 167 through the drive apparatus described below in FIG. 2, a spring 175 (seen in FIG. 6) exerts a biasing force upon closure plate 151 urging it upwardly against cam 162. Thus as shaft 106 rotates cam 162 the position of closure plate 151 within guides 154 and 155 is moved vertically. When either of lobes 163 or 164 are pressed against rib 160, closure plate 151 is moved maximally in the downward direction indicated by arrow 165. Conversely, when the minor diameters of cam 162 are forced against rib 160, closure plate 151 moves to its maximum upward position as indicated by arrow 166. As a result, the rotation of cam 162 moves closure plate 151 up and down within this range of movement. The use of images upon closure plate 151 such as lip image 161 gives the appearance of mouth movement to image 63. This mouth movement continues so long as cam 162 is being rotated by shaft 106.

Figure 4:
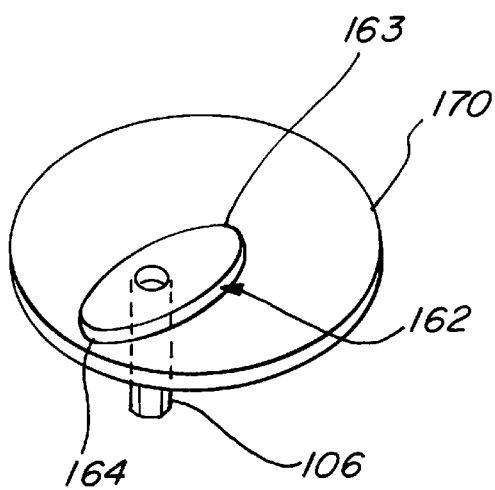
FIG. 4 sets forth a perspective view of the eccentric cam mechanism utilized in the movement of the animated character face of the present invention.

FIG. 4 sets forth a perspective view of cam 162 supported upon the end of shaft 106. As described above, cam 162 includes cam lobes 163 and 164. Also shown in FIG. 4, an eccentric plate 170 having a generally circular shape is secured to shaft 106 beneath cam 162 in an offset or eccentric attachment. This offset of eccentric plate 170 operates to provide the second dimension of animation for image 63 (seen in FIG. 3) which is described below in FIG. 7.

Figure 5:
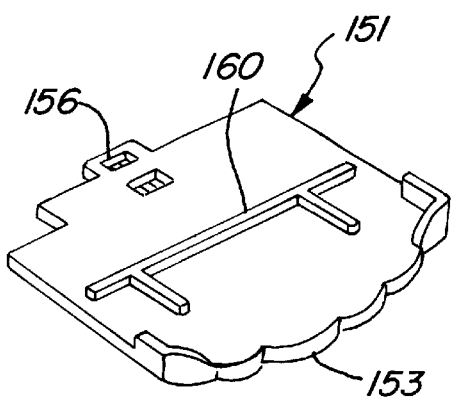
FIG. 5 sets forth a perspective view from the rear of a movable mouth member of the present invention toy used in the animated character therein.

FIG. 5 sets forth a perspective view of closure plate 151 which as described above includes a cam follower rib 160 and a bottom edge 153. Closure plate 151 further includes a spring grip 156. The view of closure plate 151 shown in FIG. 5 is a rear view in the sense that the assembly of closure plate 151 behind image 63 as shown in FIG. 3 places the cam follower rib 160 inwardly and exposes the opposite side of closure plate 151 which, as mentioned above, supports one or more mouth type images.

FIG. 6 sets forth a rear view of image 63 having closure plate 151 assembled thereto. Image 63 is secured to character plate 62 (seen in FIG. 7) by a plurality of posts 171, 172, and 173 using conventional fasteners (not shown). As described above, the rear surface of image 63 supports a pair of spaced apart generally parallel guides 154 and 155. Between guides 154 and 155, a closure plate 151 is slidably received. Image 63 further supports a spring post 174 upon which a spring 175 is supported. Spring 175 includes an end 176 which is secured within spring grip 156 of closure plate 151. Spring 175 includes an end 177 which is positioned against a post 178 formed on the underside of closure plate 151. Spring 175 produces a spring force coupled to closure plate 151 urging post 178 and closure plate 151 upwardly in the direction indicated by arrow 179. It will be recalled from the description accompanying FIG. 3 that this spring force maintains the contact of cam follower rib 160 against cam 162 (both seen in FIG. 3).

Image 63 further defines a pair of curved slots 179 and 180 which receive posts 171 and 173, respectively. In accordance with the operation set forth below in FIG. 7, the rotation of cam 162 is accompanied by the rotation of eccentric plate 170 (seen in FIG. 4) to cause image 63 to wobble back and forth in the directions indicated by arrows 185 and 188. The operation of eccentric plate 170 is set forth below in FIG. 7 in greater detail. Suffice it to note here, however, that the simultaneous rotation of cam 162 and eccentric plate 170 produces mouth movement by closure plate 151 and side-to-side or wobbling movement of image 63. The actual movement of image 63 is provided by a pivoting movement of the image which is confined by posts 171 and 173 within slots 179 and 180. Thus as image 63 is pivoted in the direction indicated by arrow 189, the opposite side of image 63 moves upwardly in the direction indicated by arrow 190. Conversely, movement of slot 180 in the direction indicated by arrow 186 results in upward of the opposite side of image 63 in the direction indicated by arrow 187.

FIG. 7 sets forth a front view of character plate 62 in which the outline of image 63 is shown for reference purposes. It will be apparent that image 63 is reversed from the position shown in FIG. 6 and secured to the frontal surface of character plate 62 to occupy the position indicated in dashed line representation in FIG. 7.

As described above, the rear surface of image 63 supports a pair of guides 154 and 155 within which a closure plate 151 is slidably supported. As is also described above, a shaft 106 supports a cam 162 (seen in FIG. 4) together with a generally circular eccentric plate 170. Plate 170 and cam 162 are rotatable with shaft 106. Character plate 162 defines a pair of downwardly angled curved slots 179 and 180 which receive posts 171 and 173, respectively. A pair of washers 181 and 182 are secured to the upper end of posts 173 and 171, respectively.

In operation, the rotation of shaft 106 by the drive means set forth below in FIG. 2, correspondingly rotates eccentric plate 170 between posts 171 and 173 which, as mentioned above, are secured to the undersurface of image 63. Thus as eccentric plate 170 rotates in the direction indicated by arrow 157, the maximum extension of eccentric plate 170 is forced against post 173 moving image 63 in the direction indicated by arrow 195 which corresponds to direction 185 in FIG. 6. Conversely, as the maximum extension or offset of eccentric plate 170 rotates into contact with post 171, image 63 is moved oppositely in the direction indicated by arrow 196 which corresponds to the direction indicated by arrow 188 in FIG. 6.

Thus as eccentric plate 170 rotates, the eccentric offset thereof causes image 63 to wobble back and forth between the positions shown in FIG. 1.

What has been shown is a speaking toy having plural messages and an animated character face in which a sound module is controlled by a multiple segment selector mechanism and in which additional special effects sounds may be introduced to the normal play. The animation of the character face is carried forward by a gear coupling mechanism together with a cam and an eccentric plate which movable portions of the character face follow.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A speaking toy comprising:

a housing having a generally circular face portion supporting an annular ring having a plurality of segments, each segment supporting an image;

a lever slidably supported with said housing having a return spring and having an end portion extending outwardly from said housing, said end portion having a handle thereon;

a character image, supported within said annular ring, having a face and movable face elements operatively connected to a center shaft;

gear drive means, coupling said lever to said center shaft, for rotating said center shaft as said lever is moved against said return spring, and released to move under the force of said return spring;

a sound module having a plurality of stored speech messages;

a pointer ring, rotatably supported on said housing within said annular ring, having a pointer, said pointer ring having a gear movable therewith;

a message selector, having a selector gear engaging said pointer ring gear coupled to said sound module for selecting a speech message from among said plurality of stored speech messages;

face movement means, coupled to said gear drive means, for moving said movable face elements as said center shaft rotates; and switch means operated by movement of said lever causing activation of said sound module to play a message selected by said pointer and said message selector.

2. The speaking toy set forth in claim 1 wherein said face of said character image includes a mouth aperture and wherein said movable face elements include a closure plate supported behind said mouth aperture.

3. The speaking toy set forth in claim 2 wherein said closure plate includes guide means and a cam follower and wherein said gear drive means includes a cam driven by said center shaft against said cam follower.

4. The speaking toy set forth in claim 3 wherein said character image defines a pair of slots and a pair of posts received therein for allowing said character image to be movable from side-to-side.

5. The speaking toy set forth in claim 4 wherein said gear drive means include an eccentric plate, coupled to said shaft and said character image for causing side-to-side movement thereof.

6. The speaking toy set forth in claim 1 wherein said message selector includes a plurality of connection pads, each corresponding to one of said stored messages and a pair of brush contacts for contact with a connection pad in response to said pointer position.

7. The speaking toy set forth in claim 6 wherein said sound module includes a plurality of non-speech sound effects and an effects switch supported on said housing for causing said sound module to play a non-speech sound effect.

8. The speaking toy set forth in claim 7 wherein said face of said character image includes a mouth aperture and wherein said movable face elements include a closure plate supported behind said mouth aperture.

9. The speaking toy set forth in claim 8 wherein said closure plate includes guide means and a cam follower and wherein said gear drive means includes a cam driven by said center shaft against said cam follower.

10. The speaking toy set forth in claim 9 wherein said character image defines a pair of slots and a pair of posts received therein for allowing said character image to be movable from side-to-side.

11. The speaking toy set forth in claim 10 wherein said gear drive means include an eccentric plate, coupled to said shaft and said character image for causing side-to-side movement thereof.

* * * * *